United States Patent
Strumolo

(10) Patent No.: US 6,636,258 B2
(45) Date of Patent: Oct. 21, 2003

(54) 360° VISION SYSTEM FOR A VEHICLE

(75) Inventor: Gary Steven Strumolo, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/682,794

(22) Filed: Oct. 19, 2001

(65) Prior Publication Data

US 2003/0076415 A1 Apr. 24, 2003

(51) Int. Cl.[7] .................................................. H04N 7/18
(52) U.S. Cl. ........................................................ 348/149
(58) Field of Search ................................ 348/149, 148, 348/170, 119, 169, 113, 36; 340/904, 436, 435, 903; 701/301, 216, 213, 23

(56) References Cited

U.S. PATENT DOCUMENTS

| | | | |
|---|---|---|---|
| 3,229,576 A | | 1/1966 | Rees |
| 3,846,809 A | * | 11/1974 | Pinzone et al. ................ 396/21 |
| 4,518,990 A | | 5/1985 | Gilvydis |
| 4,686,888 A | | 8/1987 | Sanborn et al. |
| 4,913,458 A | | 4/1990 | Hamilton |
| 5,166,878 A | | 11/1992 | Poelstra |
| 5,491,464 A | | 2/1996 | Carter et al. |
| 5,563,650 A | | 10/1996 | Poelstra |
| 5,617,085 A | | 4/1997 | Tsutsumi et al. |
| 5,670,935 A | | 9/1997 | Schofield et al. |
| 5,790,183 A | | 8/1998 | Kerbyson |
| 5,793,308 A | | 8/1998 | Rosinski et al. |
| 5,920,337 A | | 7/1999 | Glassman et al. |
| 5,949,331 A | | 9/1999 | Schofield et al. |
| 6,057,880 A | | 5/2000 | Schnee |
| 6,114,973 A | * | 9/2000 | Winner et al. ................ 340/905 |
| 6,138,062 A | * | 10/2000 | Usami .......................... 701/23 |
| 6,172,601 B1 | | 1/2001 | Wada et al. |
| 6,191,704 B1 | * | 2/2001 | Takenaga et al. ............ 340/903 |
| 6,222,683 B1 | | 4/2001 | Hoogland et al. |
| 6,317,057 B1 | * | 11/2001 | Lee .............................. 340/901 |

* cited by examiner

Primary Examiner—Vu Le
Assistant Examiner—Behrooz Senfi
(74) Attorney, Agent, or Firm—Artz & Artz; Frank A. MacKenzie

(57) ABSTRACT

A vehicle monitoring system including a camera mounted on top of the vehicle reflector in operative relation to the camera. The camera and the conical reflector provide a 360° field of view image around the vehicle. A controller is also included is adapted to detect objects within the field of view image, and determine a reference angle between the vehicle and a detected object. The controller also generates a distance value between the vehicle and the detected object as a function of a lane (w) and a reference angle (q). In one embodiment, the system includes an overhead-view display system including a reference vehicle indicator representative vehicle within the environment and an indicator element adapted to display the detected object with respect to the vehicle indicator as a function of the distance value.

20 Claims, 2 Drawing Sheets

360° VISION SYSTEM FOR A VEHICLE

BACKGROUND OF THE INVENTION

The present invention relates generally to a vision system for a vehicle, and more particularly, concerns a 360° vision system for a vehicle for indicating the existence of and relative distance to other vehicles proximate the reference vehicle.

Injury, death, and financial loss as a result of automobile accidents are some of the greatest concerns in today's society. Improving the safety of our transportation system, including the roads and the vehicles which travel thereon, is an on-going effort. In this regard, vehicle manufacturers continue to make vehicle safety a highest priority. To this end, impressive advances have been made in various areas of technology relating to automotive collision management, avoidance, and warning systems. Numerous patents have been issued which are directed toward detecting objects such as other vehicles or roadside barriers in the environment around a moving vehicle. These include radar and optical based vehicle environment systems.

Safe driving decisions can best be made with a complete understanding of the surrounding vehicle environment. Thus, it is advantageous to have knowledge regarding the existence of any vehicle proximate to the operator's vehicle, the relationship between the operator's vehicle and any adjacent vehicles as well as the threat assessment posed by the relative position of adjacent vehicles, i.e., whether they are very near or whether they are rapidly approaching. Vehicle side-view mirrors and rearview mirrors can provide partial understanding of the surrounding vehicle environment, but require the vehicle operator to divert his or her attention from the road and provide only a partial view of the areas adjacent the vehicle. Thus, there exists a need for improving a vehicle operator's awareness of his or her surrounding environment.

Most sensors for detecting the presence of and relative distance to vehicles adjacent an operator's vehicle are positioned at the front or rear of the vehicle such as integrated into the front and rear bumpers, or somewhere along the sides of the vehicle to detect adjacent vehicles in the "blind spots" of the side-view mirrors. Distance measurements to the detected vehicles are obtained typically accomplished by radar-type sensing systems. Some of these solutions for the detection of and measurement to a detected vehicle can be costly and complex. Thus, there exists a need for a simplified vision system for a vehicle that provides a 360° field of view as well as a simplified means for determining the relative distance to a detected vehicle within the field of view.

SUMMARY OF THE INVENTION

In the present invention, the aforementioned problem is solved through the provision of a vehicle environment monitoring system including a camera mounted on top of the vehicle and a conical reflector in operative relation to the camera. The camera and the conical reflector provide a 360° field of view image around the vehicle. A controller is also included which is adapted to detect objects within the field of view image, and determine a reference angle between the vehicle and a detected object. The controller also generates a distance value between the vehicle and the detected object as a function of a lane width value (w) and a reference angle (q). In one embodiment, the system includes an overhead-view display system including a reference vehicle indicator representative of the vehicle within the environment and an indicator element adapted to display the detected object with respect to the vehicle indicator as a function of the distance value.

One advantage of the present invention is that only one sensor is required to achieve a 360° field of view around the reference vehicle. Another advantage, is that the vehicle environment awareness sensor is in a relatively safe location on the vehicle and is less prone to damage or interference than other vehicle or object awareness sensors which are typically located on the bumpers or body of the reference vehicle.

Other advantages of the invention will become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings.

DETAILED DESCRIPTION

Figure 1:
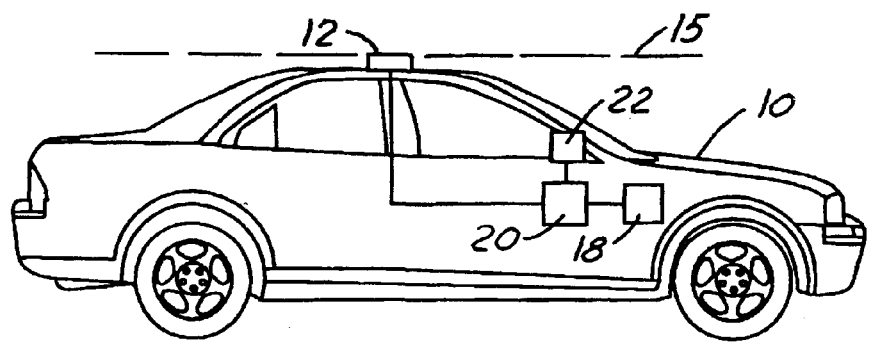
FIG. 1 is a schematic view of a vehicle equipped with a vehicle environment monitoring system according to one embodiment of the present invention.

Referring now to FIG. 1 there is shown a schematic diagram of a vehicle equipped with a vehicle environment monitoring system in accordance with an embodiment of the present invention. Vehicle 10 includes an environmental awareness sensing system 12 to help locate the vehicle 10 with regard to objects or other vehicles proximate to the vehicle 10. Vehicle 10 may further include a GPS system 18 for locating the vehicle in absolute terms as is known in the art. The information and data collected by the sensing systems 12 and 18 is communicated to controller 20 for processing and displaying on a screen or display 22 which is presented to the vehicle operator.

The controller 20 is preferably a microprocessor-based controller having associated inputs, outputs, a communication bus and memory such as RAM and ROM. Controller 20 may be a stand-alone controller independent from the vehicle's powertrain control module (PCM) or the controller 20 may be integrated therewith. Controller 20, if independent from the PCM, may be in communication therewith as part of an active or passive collision avoidance scheme.

Display 22 is a screen-based display such as an LCD, LED or CRT display, or may be implemented as a head's-up display (HUD) overlaying the forward vision of the vehicle operator through the vehicle windshield. Any other known display mechanisms are also contemplated by the present invention. The display 22 is used to present to the vehicle operator the information collected by the vehicle environment awareness sensing system 12.

Figure 2:
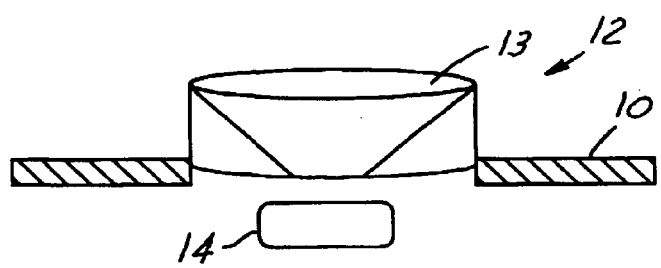
FIG. 2 is a detailed view of the vehicle environment awareness sensor of FIG. 1.

Referring now to FIG. 2, there is shown a detailed view of the vehicle environment awareness sensing system 12. The sensing system 12 comprises a camera 14 and a conical reflector 13. As shown in FIG. 2, the conical reflector is a frusto-conical shaped mirror pointing towards the lens of the camera 14 for projecting image data surrounding the vehicle 10 into the camera 14 for analysis. Other shapes for the reflector can be used provided they give a 360° field of view and their image can be deconvolved to yield angular information, e.g., a hemispherical or parabolic reflector would also work. Preferably, the sensing system 12 is located on top of the vehicle 10 as shown in FIG. 1, such that the field of view is in a plane 15 approximately commensurate with the top of the vehicle 10.

Locating the sensing system 12 on top of the vehicle has several advantages. Because the conical reflector 13 can collect image data surrounding the entirety of the vehicle 10, it eliminates the need for multiple vehicle environment sensors which typically have been located in the fore and aft portions of the vehicle such as in the bumpers, and on the sides of the vehicle. The location of the sensing system 12 is further advantageous in that it is less likely to be damaged in minor vehicle collisions, whereas bumper-based sensing systems are particularly susceptible to such damage.

Figure 3:
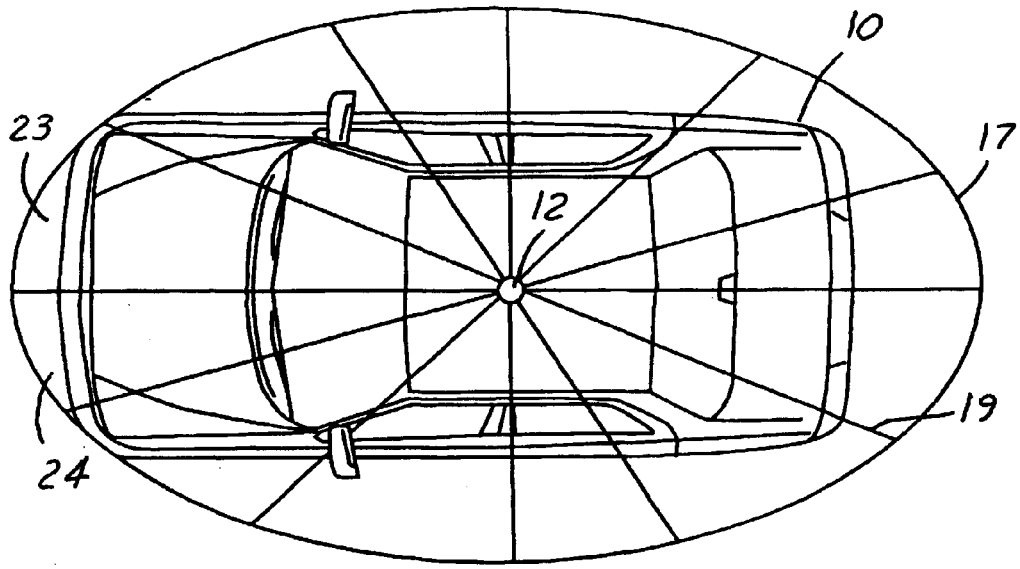
FIG. 3 is a top view of the field of view associated with the vehicle environment awareness sensor of the vehicle of FIG. 1.

Referring now to FIG. 3, there is shown a top view of the field of view 17 associated with the conical reflector sensing system 12. Due to the shape of the conical reflector 13, image data can be gathered around the entirety of the vehicle 10. For purposes of object detection, the field of view 17 can be further subdivided into segments 19, each of which is associated with a sub-segment of the 360° field of view. In the example shown in FIG. 3, the entire field of view 17 is divided into twelve segments. Each segment can be symmetrical, such as a 30° segment, or asymmetrical to correspond to a particular sub-segment of the field of view such as a "blind spot" typically associated with the C pillars of the vehicle roof. A detected object within any particular segment 19 can be used to correlate an icon on a display as explained in greater detail with reference to FIG. 5 to alert the vehicle operator to a detected object within the sensing system's field of view. Of course, because the field of view 17 covers the full 360° range continuously, it can be divided into any number of segments 19 or none at all. Further, the conical reflector 13 can be configured to reflect only those portions of the field of view which are of interest for the particular configuration under consideration. Thus, for example, segments 23 and 24 could be eliminated, as they would merely contain redundant information to that which is in the forward field of view of the vehicle operator.

Figure 4:
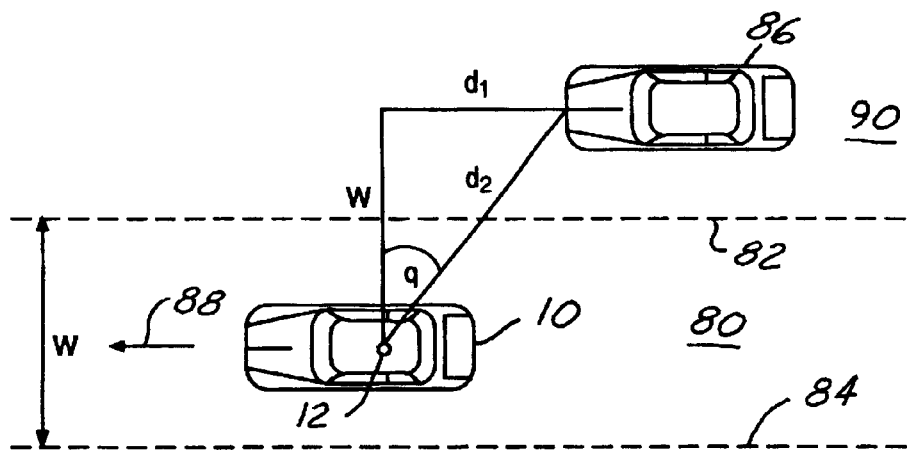
FIG. 4 is an explanatory view showing positional information between the reference vehicle and a detected vehicle in accordance with one embodiment of the present invention.

Referring now to FIG. 4 there is shown an explanatory view of the positional information. In FIG. 4, the vehicle 10 including the turret-type camera and conical reflector detection system 12 is shown traveling in a vehicle lane 80 delineated by lane markers 82, 84. A detected vehicle 86 is shown in the lane to the right of and behind the vehicle 10 traveling in the same direction. The vehicle sensing system 12 is configured by known methods to detect the presence of vehicle 86. Based on the incidence of the image on the conical reflector 13 of the sensing system 12, an angle q can be determined with respect to the detected vehicle and a line perpendicular to the direction of travel 88 of the vehicle 10.

If both vehicles 10, 86 are assumed to be in the center of their respective traffic lanes 80, 90, they are separated laterally by the width of one traffic lane as represented by w. The lane width w can be either a fixed quantity based upon the average lane width upon which the vehicle 10 is intended to be operated, or can be determined by known methods from the detection of the lane markers 82, 84.

Having determined the relational angle q to the detected vehicle 86 as well as the lane width w, the sensing system generates a linear distance ($d_1$) between the vehicle 10 and the detected vehicle 86 in the direction of travel according to the following equation:

$$d_1 = w \tan(q) \qquad (1)$$

Alternatively, or in addition, an absolute distance ($d_2$) between the vehicle 10 and the detected vehicle 86 can be determined according to the following equation:

$$d_2 = w \cos(q) \qquad (2)$$

Thus, the present sensing system 12 provides a simplified mechanism for determining the relative distances $d_1$, $d_2$ to a detected object such as a vehicle 86 as compared to conventional sensing systems which make use of laser or radar or other known more complicated apparatus for determining an absolute distance to a detected object. In this regard, the present invention is advantageous in that only the angular information need be determined to provide a relatively accurate estimate of either the linear distance $d_1$ or the absolute distance $d_2$ to a detected object.

Once an object has been detected by the system 12, it is communicated to the vehicle operator by any known method of providing vehicle environment awareness information to a vehicle operator. Preferably, the operator interface such as display 22 presents complete and accurate information regarding the vehicle surroundings to the operator at a glance.

Figure 5:
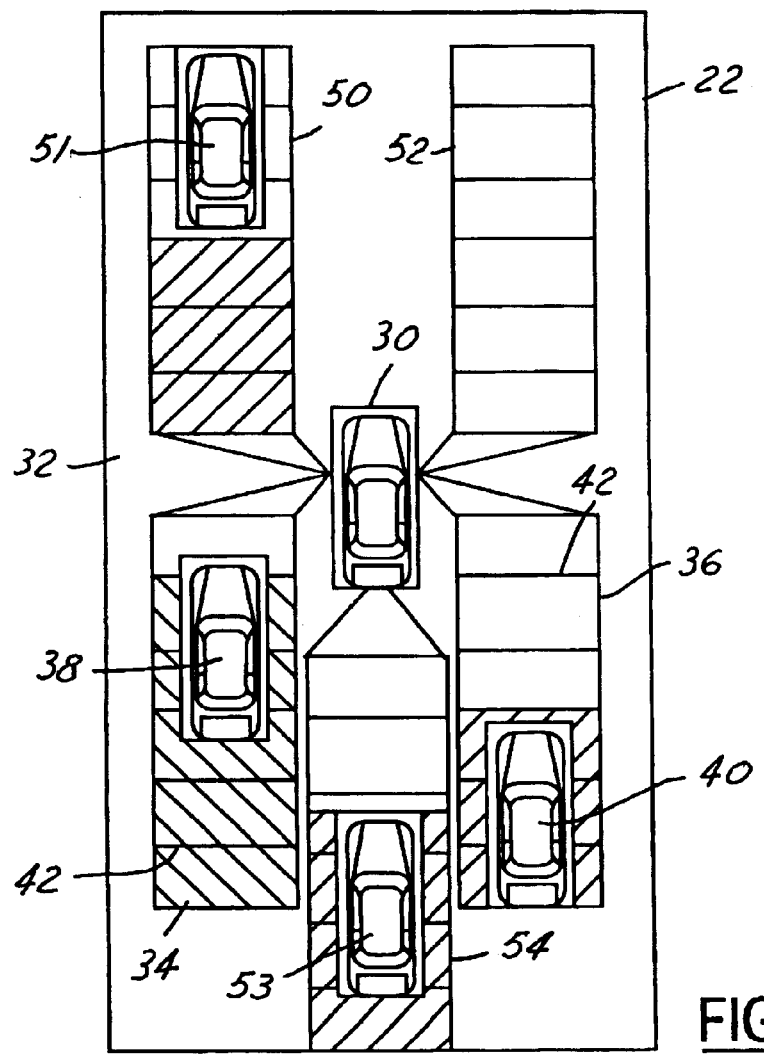
FIG. 5 is a schematic view of a vehicle environment awareness display system according to an embodiment of the present invention.

Referring now to FIG. 5 there is shown an embodiment of the display 22 for use in connection with the sensing system 12 in accordance with the present invention. The display 22 presents a reference vehicle icon 30 representing the vehicle 10 operating within an overhead or "birds eye" field of view 32. The overhead field of view 32 includes a plurality of display segments 34, 36, 50, 52, 54 which each represent a physical region adjacent to the actual vehicle 10 as represented by the reference vehicle 30. Each of the segments 34, 36, 50, 52, 54 may correspond to one of the field of view segments 19 (FIG. 3) associated with the conical reflector 13 and camera 14 of the sensing system 12. The display segments 34, 36, 50, 52, 54 are used to communicate information gathered from the sensing system 12 to the vehicle operator.

In the embodiment shown in FIG. 5, five field of view display segments 34, 36, 50, 52, 54 are shown which represent the environment to the left, and rearward of the vehicle 30, to the right and rearward of the vehicle 30, forward and to the left of the vehicle 30, forward and to the right of the vehicle 30, and directly rearward of the vehicle 30, respectively. Each display segment 34, 36, 50, 52, 54 includes several features to quickly, accurately, and completely communicate to the vehicle operator information regarding the physical regions adjacent the vehicle represented thereby. Accordingly, each display segment includes a first indicator 38, 40, 51, 53 which is activated to represent the existence of another vehicle within the region represented by the respective display segment. These indicators 38, 40, 51, 53 can be displayed as icons similar to the reference vehicle icon 30 or may be a simplified indicator such as merely a circle, square, or triangle, or the like.

In the example shown in FIG. 5, four vehicles are detected in the five regions of interest surrounding the reference vehicle 30. These vehicles are indicated by the reference indicators 38, 40, 51, and 53. Field of view segment 52 is blank which indicates that no object is currently being detected in that regional field of view. The location of each first indicator 38, 40, 51, 53 is a function of the relative distance between vehicle 10 as represented by reference vehicle 30, and the detected vehicle as represented by respective indicator as ascertained by the sensing system 12 noted above. Thus, the relative distance between the vehicle 10 and the detected vehicle is communicated to the vehicle operator by positioning the icons 38, 40, 51, 53 along the display grid 42 wherein each grid line is related to an absolute or relative distance between the vehicle 10 and the detected vehicle. Thus, for example, if the grid lines are calibrated to represent 5 feet of actual distance, the detected vehicle represented by icon 38 would be approximately in line with the rear bumper of the vehicle 10, whereas the detected vehicle represented by icon 40 would be in the lane to the right of the vehicle 10 and approximately 20 feet behind the rearend of the vehicle 10.

In addition to the relative position of the detected vehicle icons with respect to the reference vehicle 30, the display segments 34, 36, 50, 52, 54 can also be colorized to convey relative distance information. Thus, for example, the display segments which include a detected vehicle can be illuminated red in their entirety or commensurate with the leading edge of the icon to indicate a detected vehicle too close to allow, for example, a lane change by the reference vehicle. In a similar manner, a safe detected distance from a detected vehicle can be indicated by illuminating the display segment green, either in its entirety or commensurate with the leading edge of the detected vehicle.

If the rungs of the grid 42 are calibrated to indicate segments equivalent to 5 feet, the color scheme of the associated display segments could be red for detected vehicles within 5 feet of the reference vehicle, yellow for detected vehicles within 5 feet and 10 feet from the reference vehicle, and green for detected vehicles greater than 10 feet from the rear bumper of the reference vehicle 30. In this way, the vehicle operator can determine at a glance whether a left or right lane change can be executed safely. Of course, other colors can be used to convey the same information. Preferably read, yellow and green are used, however, due to their significance as traffic flow indicators.

Alternatively, the colorization scheme can act as a second indicator for each display segment by indicating the direction of change of relative distance between the reference vehicle and a detected vehicle. Thus, as shown in FIG. 5, the display segment 34 may be colorized red to indicate that the detected vehicle as represented by icon 38 is approaching the reference vehicle 30. In a similar manner, display segment 36 can be colorized green to indicate that the relative distance between the reference vehicle 30 and detected vehicle 40 is increasing.

Preferably, as long as a vehicle or object is detected within the relevant field of view, the distance information (either $d_1$ or $d_2$) is continuously updated based upon the detected reference angle (q) and the operator display system correspondingly updated to reflect this new information. Thus, the relative separation between the reference vehicle and the detected vehicles can be determined in absolute terms as well as relative terms by comparing the difference of position between the two vehicles over two time steps to determine if a detected vehicle is approaching or receding from the reference vehicle 10.

From the foregoing, it can be seen that there has been brought to the art a new and improved vehicle environment sensing system which provides accurate and complete information regarding the physical surroundings of a driven vehicle. While the invention has been described in connection with one or more embodiments, it should be understood that the invention is not limited to those embodiments. Numerous other modifications may be made by those of skill in the art, particularly in light of the foregoing teachings. Accordingly, the invention covers all alternatives, modifications and equivalents as may be included within the spirit and scope of the appended claims.

What is claimed is:

1. A vehicle environment monitoring system comprising:
   a camera mounted on top of said vehicle;
   a conical reflector in operative relation to said camera, said camera and said reflector providing a 360° field of view image around said vehicle; and
   a controller adapted to detect objects within said image, determine a reference angle between said vehicle and a detected object from said image, and generate a distance value between said vehicle and said detected object as a function of a lane width value (w) and said reference angle (q).

2. A vehicle environment monitoring system according to claim 1 further comprising:
   an overhead-view display system including a reference vehicle indicator representative of said vehicle within said environment and an indicator element adapted to display said detected object with respect to said vehicle indicator as a function of said distance value.

3. A vehicle environment monitoring system according to claim 1 wherein said lane width value (w) is a fixed value.

4. A vehicle environment monitoring system according to claim 1 wherein said lane width value (w) is determined as a function of lane width markers.

5. A vehicle environment monitoring system according to claim 1 wherein said reference angle (q) is determined with respect to a line perpendicular to a direction of travel of said vehicle.

6. A vehicle environment monitoring system according to claim 5 wherein said distance value is equal to an absolute distance ($d_2$) between said vehicle and said detected object.

7. A vehicle environment monitoring system according to claim 5 wherein said distance value is equal to a linear distance ($d_1$) between said vehicle and said detected object in the direction of travel of said vehicle.

8. A vehicle environment monitoring system according to claim 7 wherein said linear distance ($d_1$) is equal to w tan (q).

9. A vehicle environment monitoring system according to claim 1 wherein said 360° field of view image subdivided into a plurality of angular segments.

10. In a vehicle environment monitoring system including a conical reflector in operative relation to a camera mounted on said vehicle for providing a 360° field of view image around said vehicle, a method of displaying surrounding objects comprising:
    detecting objects within at least a segment of said image;
    determining a reference angle (q) between said vehicle and a detected object from said image;
    determining a lane width value (w);
    generating a distance value between said vehicle and said detected object as a function of said lane width value (w) and said reference angle (q); and
    displaying a representation of said detected object with respect to a reference vehicle indicator representative of said vehicle as a function of said distance value.

11. The method according to claim 10 wherein determining a lane width value (w) includes measuring a distance between lane markers.

12. The method according to claim 10 wherein determining a lane width value (w) includes using a predetermined lane width value.

13. The method according to claim 10 wherein generating a distance value includes generating an absolute distance ($d_2$) between said vehicle and said detected object.

14. The method according to claim 10 wherein generating a distance value includes generating a linear distance ($d_1$) between said vehicle and said detected object in the direction of travel of said vehicle.

15. The method according to claim 14 wherein said linear distance ($d_1$) is equal to w tan (q).

16. A vehicle environment monitoring system comprising:
   a camera mounted on top of said vehicle;
   a conical reflector in operative relation to said camera, said camera and said reflector providing a 360° field of view image around said vehicle; and
   means for detecting objects within said image and determining a reference angle between said vehicle and a detected object from said image;
   a controller adapted to generate a distance value between said vehicle and said detected object as a function of a lane width value (w) and said reference angle (q).

17. A vehicle environment monitoring system according to claim 16 further comprising means for displaying a reference vehicle indicator representative of said vehicle within said environment and an icon of said detected object with respect to said vehicle indicator as a function of said distance value.

18. A vehicle environment monitoring system according to claim 16 wherein said lane width value (w) is a fixed value.

19. A vehicle environment monitoring system according to claim 16 wherein said distance value is equal to a linear distance ($d_1$) between said vehicle and said detected object in the direction of travel of said vehicle.

20. A vehicle environment monitoring system according to claim 19 wherein said linear distance ($d_1$) is equal to w tan (q).

* * * * *